May 23, 1950

A. M. STONER 2,508,731

LATHE CHUCK

Filed Dec. 19, 1946

INVENTOR.
ARTHUR MERRICK STONER

BY
E. W. Marshall
ATTORNEY.

May 23, 1950 A. M. STONER 2,508,731
LATHE CHUCK
Filed Dec. 19, 1946 3 Sheets-Sheet 2
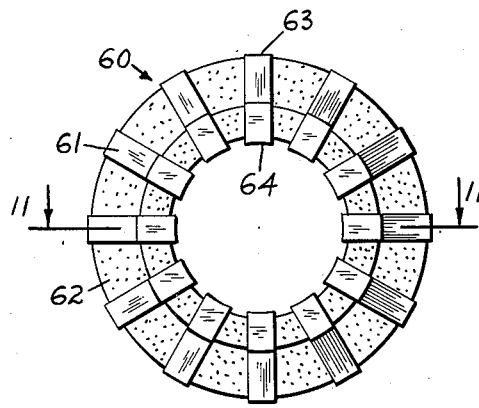
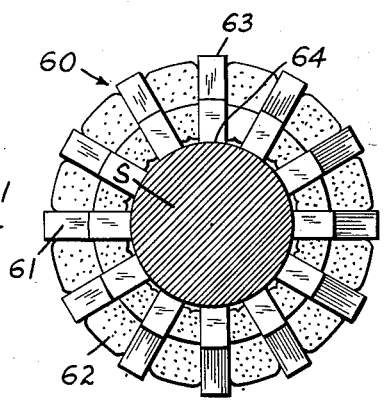
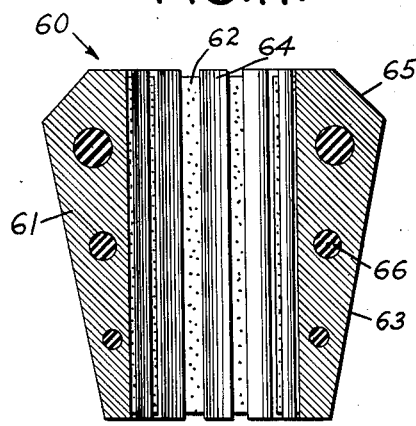
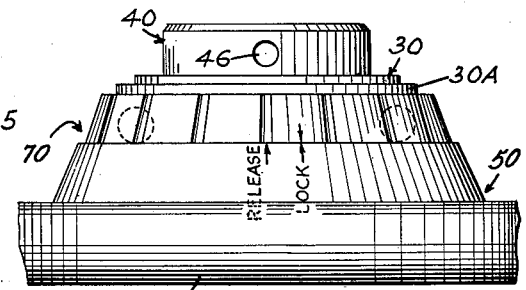
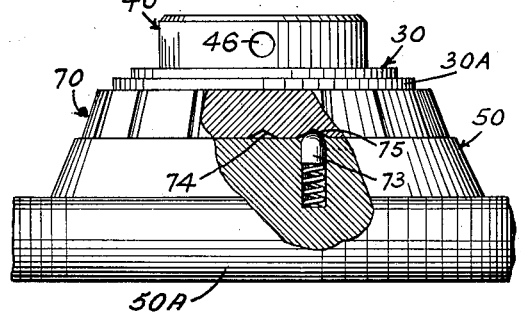
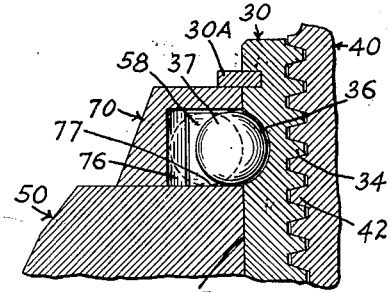
INVENTOR.
ARTHUR MERRICK STONER
BY
E. W. Marshall
ATTORNEY.

May 23, 1950 A. M. STONER 2,508,731
LATHE CHUCK

Filed Dec. 19, 1946 3 Sheets-Sheet 3

INVENTOR.
ARTHUR MERRICK STONER
BY
E. W. Marshall
ATTORNEY.

Patented May 23, 1950

2,508,731

UNITED STATES PATENT OFFICE 2,508,731

LATHE CHUCK

Arthur Merrick Stoner, West Hartford, Conn., assignor to The Jacobs Manufacturing Company, Hartford, Conn., a corporation of Connecticut Application December 19, 1946, Serial No. 717,174

8 Claims. (Cl. 279—52)

This invention relates to a lathe chuck, and its object is to provide a simple and rugged structure, in which is a collet and an actuating instrumentality therefor which includes a lost-motion connection for increasing the grip of the collet upon an inserted article and for releasing the grip of the collet on the article.

A further object is to provide mechanism for locking together the parts between which the lost motion occurs.

Another object is to provide a chuck which is especially adapted for use in heavy-duty precision work and which is also capable of holding fragile articles with a sensitive grip.

This is a continuation in part of application Serial No. 622,889 which I filed on October 17, 1945, now abandoned.

These and other objects of the invention will appear in the following specification, and its novel features will be set forth in the claims.

Referring to the drawings,

Fig. 3 is a side elevation of some of the parts of the chuck;

Fig. 4 is a side elevation of the parts shown in Fig. 3, with some of these parts broken away to show a detail of construction in section;

Fig. 7 is a sectional side elevation taken on the broken line 7—7 of Fig. 5 to show another structural detail on a larger scale;

Figs. 9 and 10 are enlarged front elevations of a collet which forms a part of the chuck; and Fig. 11 is a sectional plan view of the collet. The section in this figure is taken on the line 11—11 of Fig. 9.

Figure 1:
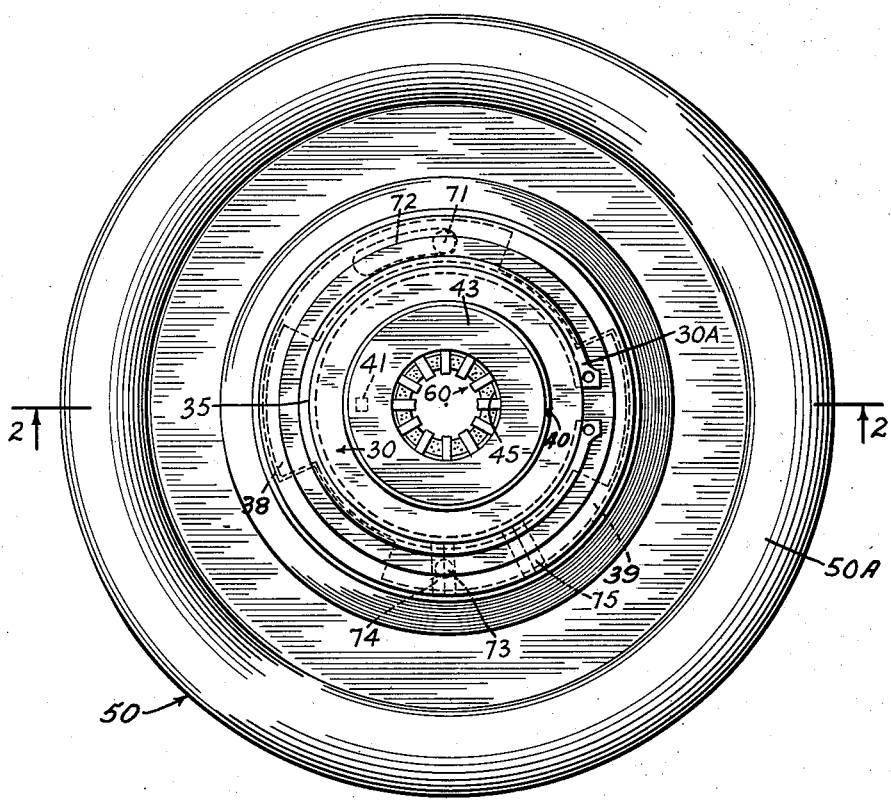
Fig. 1 is a front elevation of a chuck made according to and embodying this invention.

20 designates a hollow rotatable body arranged to be attached to and driven by a machine tool, such as a lathe. In the particular form shown, the body has an outwardly extending flange 21 at one end adapted to rest upon the base plate of a lathe or other machine tool and to be affixed thereto by bolts passing through angularly spaced openings 22 in the flange. 23 is an outer cylindrical surface on the body adjacent the flange, in which surface is an annular ball race 24. The outer forward part 25 of the body is also cylindrical, but of smaller diameter than the part 23. A longitudinally disposed keyway 26 is cut into this part of the body. 27 is an inner cone-shaped cam surface formed in the forward part of the body.

30 designates an actuating sleeve rotatably mounted on the cylindrical surface 23 of the body. In it is a ball race 31. Balls 32 are inserted between the ball races 24 and 31 through a radial hole 33 in the sleeve. These balls prevent relative longitudinal movement between the body 20 and the sleeve 30. The forward part of the sleeve is interiorly threaded as at 34 and overlies the part 25 of the body with clearance. The outside 35 of this forward part of the sleeve is cylindrical, and in it are two diametrically opposed ball indentations 36, 36, which are clearly shown in Figs. 2, 5, 6 and 7. Locking balls 37 are in these indentations. At the rear end of the sleeve are two diametrically opposed outwardly projecting lugs 38, 39.

40 is a pressure member slidably mounted on the part 25 of the body in the clearance between the body and the actuating sleeve 30. In it is a keyway, in which is a key 41, which engages the keyway 26 in the body and prevents relative rotation between the pressure member and the body. The pressure member has external threads 42, which mesh with the threads 34 on the sleeve, and an inwardly projecting flange 43 at its outer end which has a beveled inner abutment surface 44 and a clearance opening 45. 46 designates openings through the pressure member in the forward part thereof to provide for the escape of any foreign matter which may accumulate inside of the pressure member.

Figure 8:
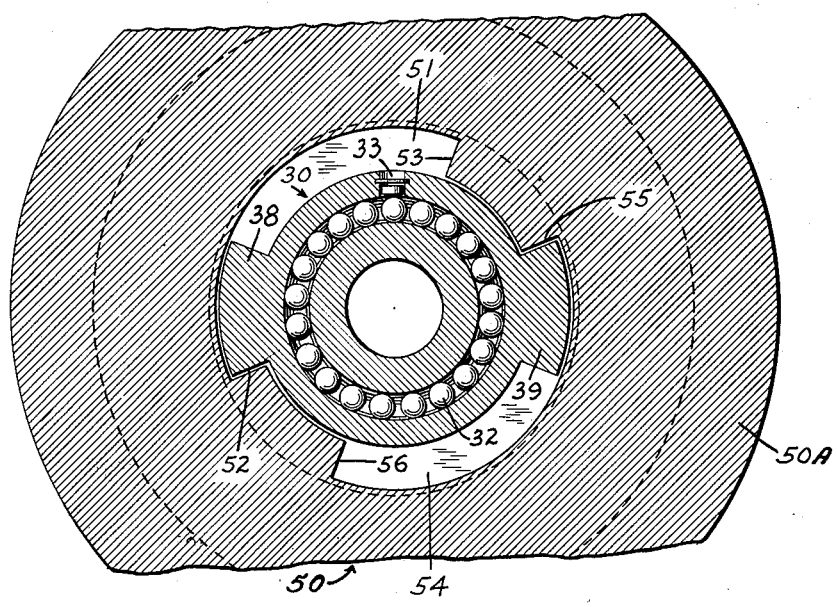
Fig. 8 is a sectional front elevation of the chuck taken on the line 8—8 of Fig. 2.

50 is a hand wheel, the hub of which, mounted on the outside of the actuating sleeve 30, forms a shock collar, in which are two interrupted arcuate grooves 51, 54, which receive the lugs 38, 39 of the sleeve. These grooves are longer than the lugs and provide for a lost-motion rotation between the shock collar 50 and the sleeve 30. The ends of the groove 51 are designated by the reference numerals 52, 53, and the ends of the groove 54 are designated by the reference numerals 55, 56. In Fig. 8 the lug 38 is shown abutting the end 52 of groove 51, and the lug 39 is shown abutting the end 55 of the groove 54. The forward face of the shock collar designated by 57 is normal to the axis of the chuck, and a flange 58 extends forwardly from it.

60 designates a collet. In the form shown this is constructed according to my Patent No. 2,346,706, issued to me August 18, 1941, and comprises a plurality of rigid gripping members 61 interconnected by a body 62 of resilient material. The outer edges 63 of the gripping members are tapered at the same angle from the axis of the body 20 as is the cam surface 27. The inner edges 64 are parallel with the axis. The forward edges 65 are inclined from the vertical at the angle of inclination of the abutment surface 44 of the pressure member and are arranged to be engaged by that abutment surface. The gripping members may be transversely perforated as at 66, and when they are, the resilient material passes through them. Oil-proof synthetic rubber is a suitable material for the body 62. The gripping members are radially disposed and angularly spaced equally, and the body 62 preferably is affixed to them, as, for example, by vulcanization.

Figure 2:
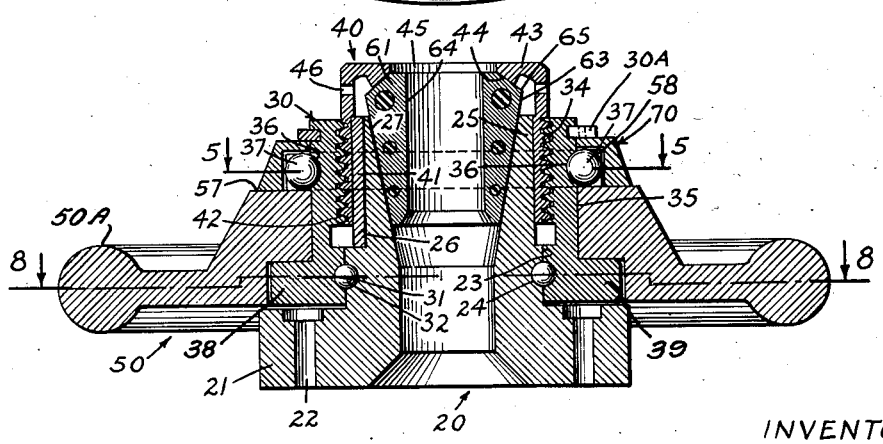
Fig. 2 is a sectional plan view of the chuck, the section being taken on the line 2—2 of Fig. 1.

When the parts are assembled, as shown in Figs. 1 and 2, the outer ends of the edges 64 of the gripping members are near the forward end of the pressure member 40. This enables a tool or the like to be centered with great nicety. Right-hand rotation of the sleeve 30 imparts a rearward movement to the pressure member 40, and this forces the gripping members inwardly. During this operation the inner edges 64 of the gripping members remain in parallelism with the axis of the conical cam surface. When the collet is tightened its gripping members are moved inwardly to the position shown in Fig. 10, in which to engage a bar of work S, and the parts of the body 62 between the gripping members are squeezed together and outwardly.

The actuating sleeve 30 is rotated in a clockwise direction by moving the hand wheel 50. When the latter is rotated in a clockwise direction, or by retarding the rotation of the shock collar when the chuck is being driven in an anti-clockwise direction, as shown in Fig. 8. The engagement of the end 52 of the slot 51 with the lug 38, and the engagement of the end 55 of the slot 54 with the lug 39 will rotate the actuating sleeve 30, and this will move the pressure member rearwardly to force the gripping members inwardly. When the gripping members engage an article between them, as shown in Fig. 10, they can be tightened by backing the ends 52, 55 away from the lugs 38, 39, and returning them rapidly to impart sudden impacts on the lugs. The mass of the hand wheel is considerably greater than that of the actuating sleeve, and its rim 50A is further removed from the axis of the chuck, so that its momentum produces a powerful tightening effect of the collet upon the article between its gripping members. These sudden impacts may be repeated, if desired. When it is desired to loosen the collet, the hand wheel 50 is rotated rapidly in the opposite direction to bring the end 53 of slot 51 sharply against the lug 38, and the end 56 of slot 54 against the lug 39. These sudden impacts may be repeated, if necessary, and the simultaneous rotation of the collar and sleeve continued until the collet is open and the article between its gripping members is released.

As this apparatus is especially designed for precision work, a number of collets of different inner dimensions may be furnished with each chuck.

The apparatus so far described is similar to, and its operation is the same as, that described in the aforesaid application Serial No. 622,889. It has been found in practice that when the rotation of the chuck is arrested somewhat suddenly, the hand wheel will continue to rotate because of its momentum. In use on a lathe, for example, the chuck is rotated normally in an anti-clockwise direction. When it is stopped suddenly by applying the lathe spindle brake, there is a tendency for the hand wheel 50 to rotate on the sleeve in an anti-clockwise direction. This sometimes results in the ends 53, 56 of the slots 51, 54 striking the lugs 38, 39 with sufficient force to loosen the gripping members of the collet from the article engaged between them, with disastrous consequences. I have devised a way of overcoming this difficulty by providing a simple mechanism by means of which the hand wheel can be locked to the actuating sleeve whenever desired.

70 is a lock ring surrounding the cylindrical surface 35 of the actuating sleeve and resting upon the forward face 57 of the shock collar. It can be rotated about these parts to an extent which is limited by the engagement of a pin 71, extending forwardly from the face 57, with the ends of an arcuate slot 72 cut into the base of the lock ring. 73 is a pin in the shock collar which is spring-pressed into engagement with the lock ring. In the lock ring are two radially disposed angularly spaced grooves 74, 75. The pin 73 engages one or the other of these slots when the lock ring is at either end of its rotative movement on the shock collar and actuating sleeve. Indentations instead of grooves in the base of the lock ring may be used if desired to receive the end of the pin 73. This arrangement forms a non-positive stop for preventing accidental movement of the lock ring. The inner surface of the lock ring is cylindrical, and in it are two diametrically opposed indentations 76. The locking balls 37 are in diametrically disposed radial slots 59 in the flange 58 of the shock collar.

Figure 5:
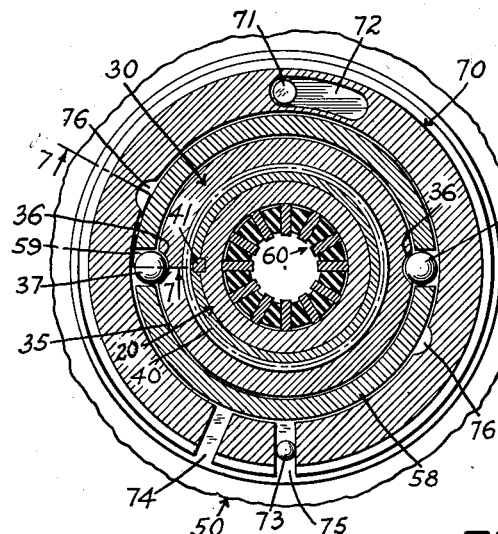
Fig. 5 is a sectional front elevation of the chuck, taken on the line 5—5 of Fig. 2, with its parts in certain relative positions.
Figure 6:
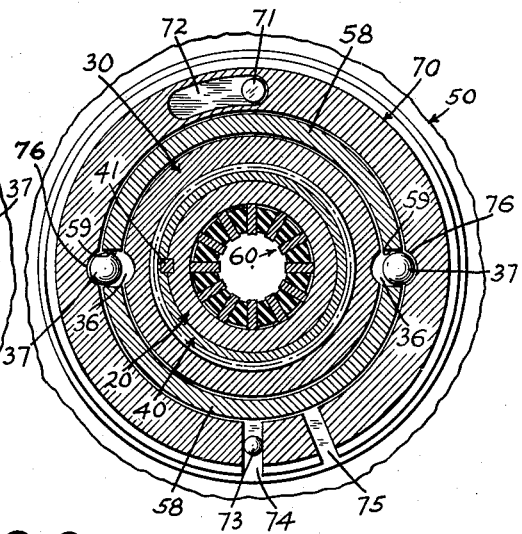
Fig. 6 is a view similar to Fig. 5, with the parts in different relative positions.

When the pin 73 is in the groove 75, as shown in Figs. 4 and 5, the locking balls 37 are retained in the indentations 36 in the actuating sleeve by the inner surface of the lock ring 70, as shown in Figs. 2 and 5, and in full lines in Fig. 7. This locks the hand wheel to the actuating sleeve 30, preventing relative rotation between the shock collar and actuating sleeve. By turning the lock ring to bring the pin 73 into the groove 74, the indentations 76 on the lock ring are brought into alignment with the slots 59 in the flange 58 of the shock collar. The locking balls 37 can then move out of the indentations 36 in the actuating sleeve into the indentations 76 in the lock ring 70. This is shown in Fig. 6 and by the position of the balls shown in dotted lines in Fig. 7. The hand wheel is then capable of the lost-motion rotation on the actuating sleeve, which has been described.

The lock ring is held on the actuating sleeve by a split ring 30A, which fits into an annular groove in the actuating sleeve. The outside of the lock ring may be fluted, as shown, to facilitate its operation. Indicia on the outside of the lock ring and of the shock collar are provided, as shown in Fig. 3, to indicate when the lost-motion mechanism is locked or released.

Various modifications in construction, mode of operation, method and use of an invention may and do occur to others, especially after benefiting from knowledge of such a disclosure as that herein presented of the principles involved, but the invention itself is not confined to the present showing.

I claim:

1. A chuck having a body, a cam surface within said body inclined to the axis of the body, a longitudinally movable pressure member mounted on the body, a gripping device interposed between the cam surface and the pressure member, and an outer rotatable sleeve for actuating the pressure member, in which chuck an external shock collar is rotatably mounted upon the actuating sleeve, with a lost-motion hammer-blow connection provided between the shock collar and the actuating sleeve to limit the rotative relation between said collar and sleeve, combined with releasable means for locking the shock collar and the actuating sleeve together.

2. A chuck having a body, a cam surface within said body inclined to the axis of the body, a longitudinally movable pressure member mounted on the body, a gripping device interposed between the cam surface and the pressure member, an outer rotatable threaded sleeve for actuating the pressure member, and means for preventing relative longitudinal movement between the actuating sleeve and the body, in which chuck an external shock collar is rotatably mounted upon the actuating sleeve and extends outwardly therefrom, with a lost-motion hammer-blow connection provided between the shock collar and the actuating sleeve to limit the rotative relation between said collar and sleeve, combined with releasable means for locking the shock collar and the actuating sleeve together.

3. A chuck having a body, a cam surface within said body inclined to the axis of the body, a longitudinally movable pressure member mounted on the body, a gripping device interposed between the cam surface and the pressure member and an outer rotatable sleeve for actuating the pressure member, in which chuck the cam surface is conical and the gripping device is a collet comprising a plurality of angularly spaced radially disposed rigid members, the outer surfaces of which are inclined to the axis of the body and in which an external shock collar is rotatably mounted upon the actuating sleeve, with a lost-motion hammer-blow connection provided between the shock collar and the actuating sleeve to limit the rotative relation between said collar and sleeve, combined with releasable means for locking the shock collar and the actuating sleeve together.

4. A chuck having a body, a cam surface within said body inclined to the axis of the body, a longitudinally movable pressure member mounted on the body, a gripping device interposed between the cam surface and the pressure member, and an outer rotatable sleeve for actuating the pressure member, in which chuck the cam surface is conical and the gripping device is a collet comprising a plurality of angularly spaced radially disposed rigid members interconnected by a body of resilient material, the outer surfaces of which are inclined to the axis of the body and in which an external shock collar is rotatably mounted upon the actuating sleeve, which collar extends outwardly from the sleeve, with a lost-motion hammer-blow connection provided between the shock collar and the actuating sleeve to limit the rotative relation between said collar and sleeve, combined with releasable means for locking the shock collar and the actuating sleeve together.

5. A chuck having a body, a cam surface within said body inclined to the axis of the body, a longitudinally movable pressure member mounted on the body, a gripping device interposed between the cam surface and the pressure member, and an outer rotatable sleeve for actuating the pressure member, in which chuck an external shock collar is rotatably mounted upon a part of the actuating sleeve, with a lost-motion hammer-blow connection provided between the shock collar and the actuating sleeve to limit the rotative relation between said collar and sleeve, combined with a lock ring adjustably mounted on the shock collar and overlying another part of the actuating sleeve and a locking element in the shock collar interposed between the locking ring and the actuating sleeve which is moved by the locking ring, in one position of the locking ring, into engagement with the actuating sleeve, and which is out of engagement with the actuating sleeve in another position of the locking ring.

6. A chuck having a body, a cam surface within said body inclined to the axis of the body, a longitudinally movable pressure member mounted on the body, a gripping device interposed between the cam surface and the pressure member, an outer rotatable sleeve in threaded adjustable engagement with the pressure member for actuating said member, and means for preventing relative longitudinal movement between the actuating sleeve and the body, in which chuck an external shock collar is rotatably mounted upon a part of the actuating sleeve, which collar extends outwardly from the sleeve, with a lost-motion hammer-blow connection provided between the shock collar and the actuating sleeve to limit the rotative relation between said collar and sleeve, combined with a lock ring adjustably mounted on the shock collar and overlying another part of the actuating sleeve and a locking element in the shock collar interposed between the locking ring and the actuating sleeve which is moved by the locking ring, in one position of the locking ring, into engagement with the actuating sleeve, and which is out of engagement with the actuating sleeve in another position of the locking ring.

7. A chuck having a body, a cam surface within said body inclined to the axis of the body, a longitudinally movable pressure member mounted on the body, a gripping device interposed between the cam surface and the pressure member, and an outer rotatable sleeve for actuating the pressure member, in which chuck the cam surface is conical and the gripping device is a collet comprising a plurality of angularly spaced radially disposed rigid members, the outer surfaces of which are inclined to the axis of the body and in which an external shock collar is rotatably mounted upon a part of the actuating sleeve, with a lost-motion hammer-blow connection provided between the shock collar and the actuating sleeve to limit the rotative relation between said collar and sleeve, combined with a lock ring adjustably mounted on the shock collar and overlying another part of the actuating sleeve and a locking element in the shock collar interposed between the locking ring and the actuating sleeve which is moved by the locking ring, in one position of the locking ring, into engagement with the actuating sleeve, and which is out of engagement with the actuating sleeve in another position of the locking ring.

8. A chuck having a body, a cam surface within said body inclined to the axis of the body, a longitudinally movable pressure member mounted on the body, a gripping device interposed between the cam surface and the pressure member, and an outer rotatable sleeve for actuating the pressure member, in which chuck the cam surface is conical and the gripping device is a collet comprising a plurality of angularly spaced radially disposed rigid members interconnected by a body of resilient material, the outer surfaces of which are inclined to the axis of the body and in which an external shock collar is rotatably mounted upon a part of the actuating sleeve, which collar extends outwardly from the sleeve, with a lost-motion hammer-blow connection provided between the shock collar and the actuating sleeve to limit the rotative relation between said collar and sleeve, combined with a lock ring adjustably mounted on the shock collar and overlying another part of the actuating sleeve and a locking element in the shock collar interposed between the locking ring and the actuating sleeve which is moved by the locking ring, in one position of the locking ring, into engagement with the actuating sleeve, and which is out of engagement with the actuating sleeve in another position of the locking ring.

ARTHUR MERRICK STONER.

REFERENCES CITED

The following references are of record in the file of this patent:

UNITED STATES PATENTS

| Number | Name | Date |
|---|---|---|
| 1,341,934 | Schoenborn | June 1, 1920 |
| 1,534,572 | Cutler | Apr. 21, 1925 |
| 1,654,174 | Kistner | Dec. 27, 1927 |
| 1,764,289 | Emrick | June 17, 1930 |
| 1,947,060 | Reimers | Feb. 13, 1934 |
| 2,313,398 | Ronning | Mar. 9, 1943 |
| 2,337,471 | Hines | Dec. 21, 1943 |
| 2,345,069 | Phillips | Mar. 28, 1944 |
| 2,346,706 | Stoner | Apr. 18, 1944 |
| 2,406,444 | Stoner | Aug. 27, 1946 |

FOREIGN PATENTS

| Number | Country | Date |
|---|---|---|
| 295,908 | Great Britain | Aug. 23, 1928 |
| 413,696 | Germany | of 1941 |